W. E. BALLMAN.
DUST PAN.
APPLICATION FILED FEB. 27, 1908.

940,422.

Patented Nov. 16, 1909.

Witnesses
O. B. Baenziger
J. G. Howlett

Inventor
William E. Ballman
By T. A. Wheeler & Co.
Attorneys

UNITED STATES PATENT OFFICE.

WILLIAM E. BALLMAN, OF DETROIT, MICHIGAN.

DUST-PAN.

940,422.  Specification of Letters Patent.  Patented Nov. 16, 1909.

Application filed February 27, 1908. Serial No. 418,020.

*To all whom it may concern:*

Be it known that I, WILLIAM E. BALLMAN, a citizen of the United States, residing at Detroit, in the county of Wayne, State of Michigan, have invented certain new and useful Improvements in Dust-Pans; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to dust pans, and particularly to the handle therefor and the manner of attaching the handle to the pan, as will be hereinafter more fully set forth and pointed out in the claims.

The object of the invention is to produce a handle for a dust pan of such formation as to afford a leg which will raise the rear of the pan, and of such construction as to enable the handle to be readily secured in place with the use of but one rivet or fastening bolt, the weight of the handle being such as to prevent the pan moving about during the operation of sweeping the dirt thereinto. The above object is attained by the arrangement illustrated in the accompanying drawings, in which:—

Figure 1:
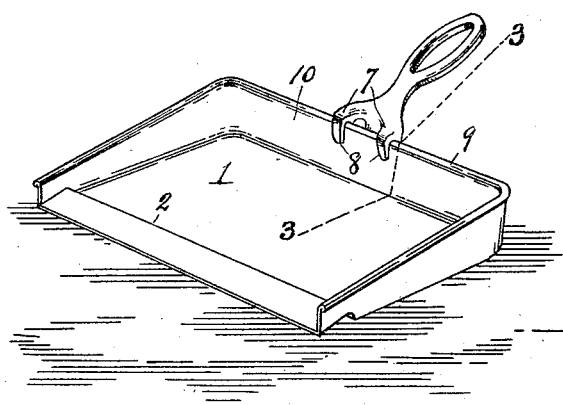
Figure 2:
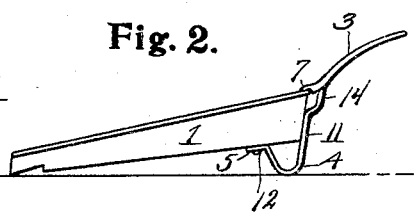
Figure 3:
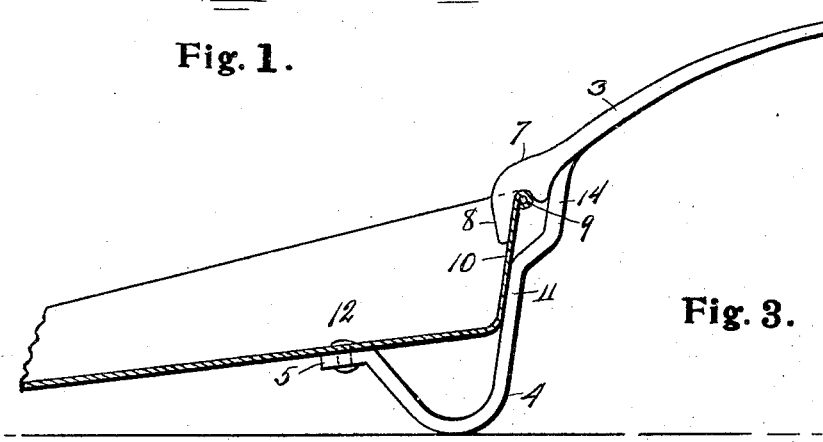
Figure 4:
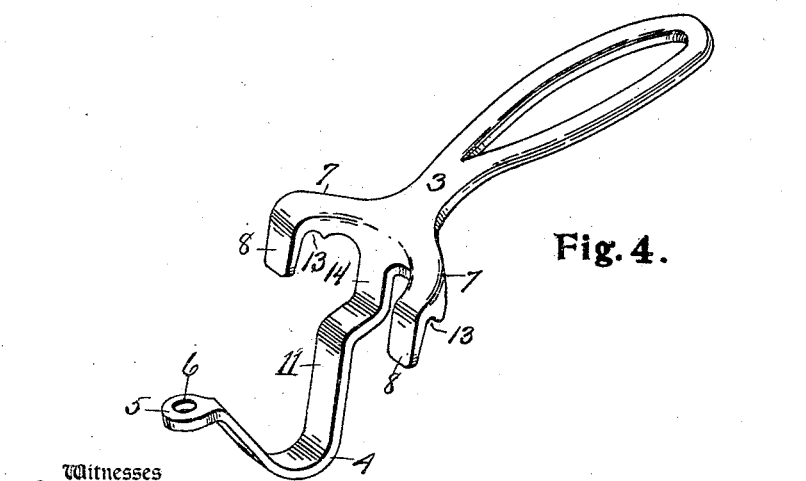

Figure 1 is a perspective view of a dust pan made in accordance with my invention. Fig. 2 is a side elevation thereof. Fig. 3 is an enlarged fragmentary view in section as on line 3—3 of Fig. 1. Fig. 4 is a perspective view of the handle detached from the pan.

Referring to the characters of reference, 1 designates the dust pan which is provided in the bottom thereof near its front edge with a transversely extending shoulder 2 which forms a ledge which retains the dirt in the pan and which also stiffens the front edge of the pan and prevents it becoming bent out of shape. The handle 3 is formed preferably of cast iron and is provided with a downwardly extending looped portion 4 which serves as a leg to support and elevate the rear edge of the pan and which is provided at its free end with a foot 5 having an aperture 6 therethrough. On each side of the leg member 4 is an outwardly curved arm 7 extending from the handle proper and having a downwardly projecting hook-shaped terminal 8. These arms extend forward such distance as to enable the hook-shaped terminals 8 thereof to engage over the rolled upper edge 9 of the back 10 of the pan, while the outer face of the back of the pan lies against the straight portion 11 of said leg, the handle being secured in place when so positioned by passing a rivet 12 through the bottom of the pan and the foot portion 5 of said leg. In this position the back of the pan is firmly held between the straight portion of said leg and the hooks 8 of the arms 7 in a manner to securely retain the handle in place when the foot of the leg is secured by the rivet 12. To more firmly lock the handle to the pan, the outer ends of the arms 7 at the juncture of the hooks therewith are provided in their under face with a transverse recess 13 adapted to receive the rolled edge 9 of the back of the pan. The offset portion 14 of the leg near its upper end is for the purpose of facilitating the placing of the handle in position upon the back of the pan preliminary to riveting the leg thereto. The downwardly extending looped portion 4 of the leg rests upon the floor and raises the rear edge of the pan so as to cause its front edge to lie close to the surface, thereby enabling the dirt to be more readily swept into the pan, which because of the weight of the handle does not slide about on the floor during the operation of sweeping.

Having thus fully set forth my invention, what I claim as new and desire to secure by Letters Patent, is:—

1. The combination with a dust pan, of a handle having forwardly projecting arms provided with downwardly extending hooked terminals which engage the back of the pan, a depending leg member centrally disposed with respect to said arms, having a straight portion which stands parallel with and bears against the outer face of the pan at the back, a downwardly extending loop which serves as a leg to elevate the rear of the pan, and a foot member which is secured to the bottom of the pan to retain the handle in place.

2. The combination with a dust pan having a rolled rear edge, of a handle provided with forwardly extending diverging arms each having a recess in its under face to receive said rolled edge and each having a terminal hook which engages the front face of the rear of the pan, a leg member extending downwardly from the handle to raise the rear of the pan, the foot portion of said leg being secured to the bottom of the pan to retain the handle in place.

In testimony whereof, I sign this specification in the presence of two witnesses.

WILLIAM E. BALLMAN.

Witnesses:
MYRTLE BALLMAN,
A. L. QUINKERT.